Feb. 9, 1937.   N. SKILLMAN ET AL   2,069,781
BEARING UNIT
Filed Aug. 29, 1932   2 Sheets-Sheet 1
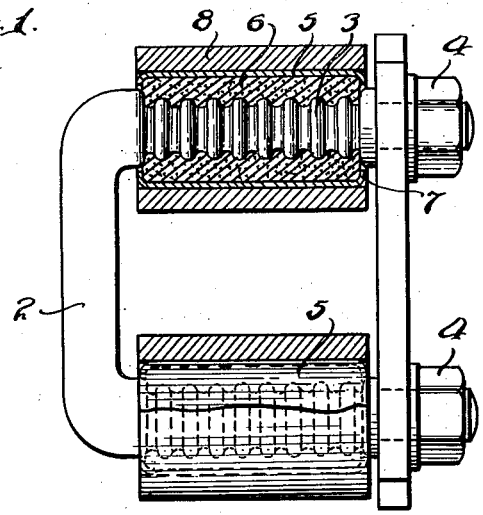
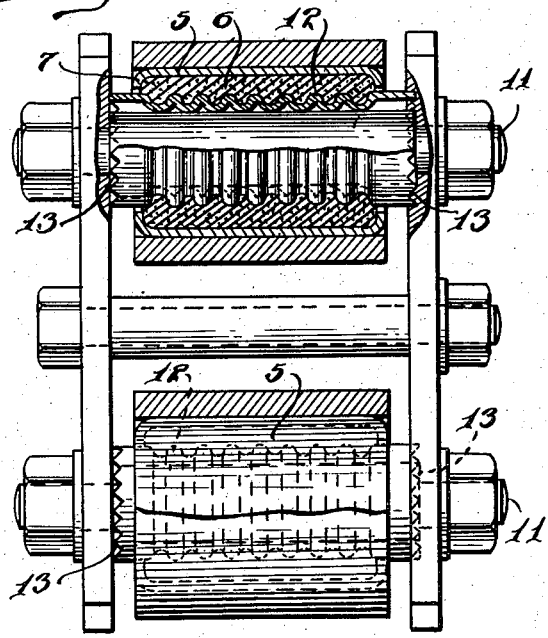
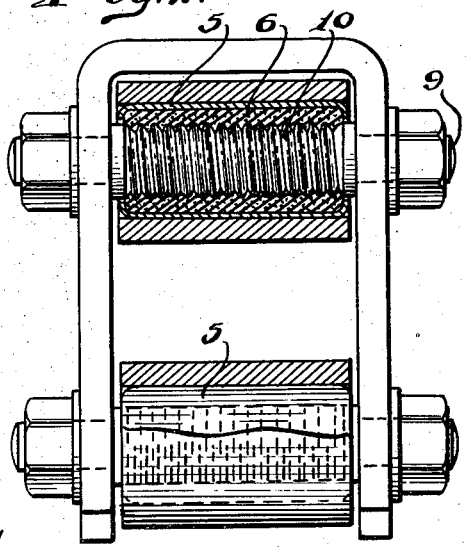
INVENTOR.
NEWTON SKILLMAN.
BY ROBERT THUNER.
ATTORNEYS

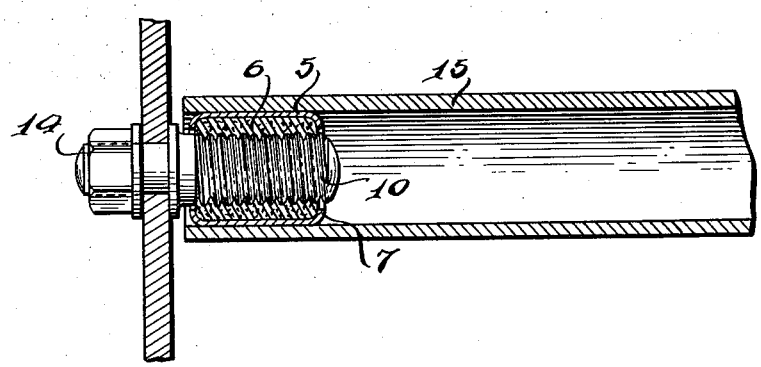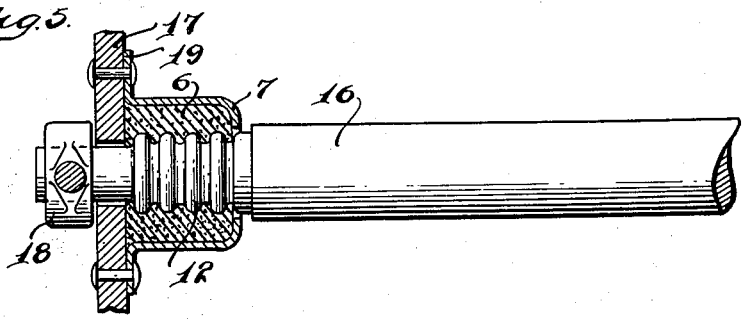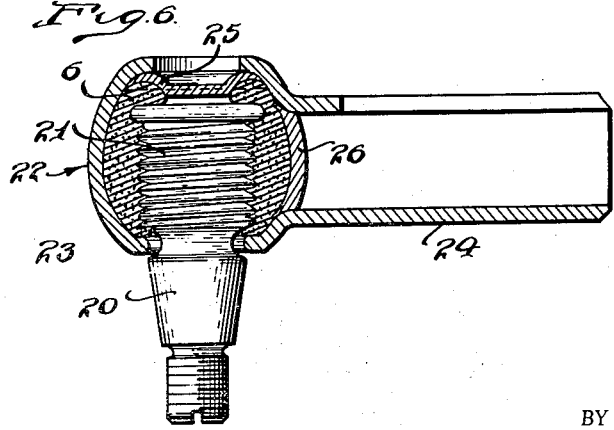

Patented Feb. 9, 1937

2,069,781

UNITED STATES PATENT OFFICE 2,069,781

BEARING UNIT

Newton Skillman and Robert Thuner, Detroit, Mich., assignors to O. & S. Bearing Company, Detroit, Mich., a corporation of Michigan.

Application August 29, 1932, Serial No. 630,769

11 Claims. (Class 287—93)

This invention relates to a bearing unit, and has to do particularly with a bearing unit of the self-lubricating type.

One of the most important and difficult problems encountered in the design of self-lubricating bearings is that of end thrust. Various attempts have been made to combat or eliminate this end thrust, such as disclosed in Patent No. 1,739,528 of December 17, 1929, and Patent No. 1,817,529 of August 4, 1931. It is the object of the present invention to provide not only an efficient and practical oscillatable bearing, but one in which the end thrust is substantially overcome by the novel fabrication of the inner bearing unit. In addition to the great resistance to end thrust the entire unit is susceptible of easy and inexpensive assembly.

Other features involving the method of assembly and the details of construction will be more clearly brought out in the specification and claims.

In the drawings:

Fig. 1 is an elevation, partly in section, of a standard type of spring shackle constructed in accordance with the present invention.

Fig. 2 is a view similar to Fig. 1, but illustrating a modified form of shackle bolt and shackle construction.

Fig. 3 is a further modified form of shackle construction where the shackle stud is formed of two parts.

Fig. 4 is a fragmentary sectional view of a self-lubricating cross brake shaft assembly embodying the present invention.

Fig. 5 is a view similar to Fig. 4 except that the threaded inner bearing member is formed directly on the end of the shaft.

Fig. 6 is a sectional view of a tie rod end embodying the present invention and illustrating the manner of assembly between an inner bearing unit of the present type and a spherical outer bearing unit.

In the embodiment disclosed in Fig. 1 the shackle bolt 2 is shown in U-shaped form and provided with rolled beads or threads 3. In the preferred form these threads are parallel and may be formed by rolling or by a forming tool in the usual manner. Each end of the shackle may be turned down and threaded to receive the nuts 4. The forming of the threads 3 is a very simple operation and eliminates the turning up of the ends of the inner bearing, as will be later described.

In the preferred method of assembly the outer bearing 5 is initially formed from a straight piece of tubing of greater diameter than that shown in Fig. 1; a strip of lubricant impregnated material 6 is wrapped annularly inside of the length of tubing and the threaded portion 3 of the shackle bolt freely inserted in place. The outer shell or tube is then subjected to sizing dies to bring the same down to the size shown in Fig. 1 and to materially compress the lubricant impregnated fibrous material 6. After this material is placed under compression the ends 7 of the outer bearing are then turned in to lock the outer bearing member in position and to hold the compressed fibrous material in place. The placing of the lubricant impregnated fibrous material under relatively great pressure obviously causes the same to be tightly pressed into the threads or beads formed around the inner bearing member.

This lubricant impregnated fibrous material, while placed under relatively great pressure, still remains expansible and as any wear takes place after long continued use expansion of the compressed material causes the same to expand and still hold the inner bearing member firmly in position.

In the disclosed embodiment the outer bearing member 5 has a press fit within the spring eye 8. The inner bearing member is always the moving member and oscillation takes place between the bearing surface of said inner bearing member and the highly compressed lubricant impregnated material 6. In some cases it may be necessary to polish the threaded surface of the inner bearing member 6 and leave the outer surface of the outer bearing member 5 rough but in any event the inner bearing member 3 is preferably the movable member. The bearing unit may also be formed by wrapping the lubricant inpregnated fibrous bushing material around the threaded portion, highly compressing the same by dies, and then inserting the compressed material within the outer sleeve 5, after which the ends are inturned to lock the parts of the entire bearing unit in permanent position.

It will thus be seen that the forming of the distinctive threads or beads in the inner bearing member not only greatly increases the bearing surface thereof but absolutely locks the inner bearing member as a part of the compressed bushing so as to completely eliminate direct end thrust. By reason of such threads being spaced lengthwise of the surface of the inner member, and by having the ends of the inner bearing member 5 turned down it is possible to have sufficient space between the end of the outer bearing member and the end of the inner bearing member to allow for relative flexibility of the parts. In other words, the axis of the inner bearing member 3 may be moved considerably relative to the axis of the outer bearing member due to the compressibility of the lubricant impregnated fibrous material, without allowing any appreciable end thrust on the inner bearing member.

The ends of the inner bearing member of stud being of the same diameter as other portions of the inner bearing member, it will be seen that this inner bearing member may be directly and easily assembled within the outer bearing member; in other words, by forming the locking or end thrust means in the form of indented threads or beads, intermediate the ends of the inner bearing member, we have made it possible to obtain a much easier and quicker assembly. The lubricant impregnated fibrous material may be of woven cotton or asbestos material impregnated with graphite but may vary considerably in its characteristics as long as it may be readily compressed and still remain expansible when assembled within the complete bearing.

In an actual test made with a bearing of the type shown in Fig. 1 the inner bearing member was subjected to two million oscillations relative to the outer bearing member with a two hundred pound dead weight load. At the beginning of the test the drag between the inner bearing member and the bushing was thirteen inch pounds and at the end of the run this drag had been reduced to ten inch pounds. However, two hours after the completion of the run the drag between the relatively movable parts had again returned to thirteen inch pounds. This temporary reduction in drag between the parts was attributed to heat developed during the run of two million continuous oscillations.

In the modification illustrated in Fig. 2 we have shown the shackle bolt 9 as being provided with threads 10 of the standard continuous type. The threads 10 may be rolled or cut as desired. If the threads are cut the crests thereof are preferably rounded so as to not cut the lubricant impregnated fibrous material. The lubricant impregnated fibrous material 6 is also highly compressed in the bearing shown in Fig. 2, and may be compressed in the well known manner by first compressing the material around the thread stem and forcing the same inside the outer bearing 5 or by forcing the outer bearing through sizing dies to reduce the diameter thereof and highly compress the material 6.

The bushing 6 being highly compressed will, in addition to its self-lubricating properties, exert considerable pressure against the threaded surface of the shackle bolt 9 so as to give a shock absorbing effect. In addition, inasmuch as the outer bearing is fixed within the spring eye and the shackle bolt 9 is stationary it will be seen that oscillation of the spring and outer bearing relative to the inner bearing or threaded surface 10 will cause the material 6, in between the threads, to be compressed longitudinally of the bearing. If the bolt 9 were free to move axially it would merely follow the pitch of the threaded grooves formed in the bushing 6, but inasmuch as the bolt is held stationary against axial movement, it will be seen that clockwise movement between the bushing and inner bearing member 10 will cause the bushing material to be compressed in one axial direction and counter-clockwise movement will cause such material to be compressed in the opposite direction. The direct result of this is that in addition to the fixed friction between the highly compressed bushing unit and inner bearing, the compression on the bushing by the threads will cause additional friction, and thus give a greater shock absorber effect.

In the modification illustrated in Fig. 3, the shackle stud or inner bearing member is formed in two parts, the inner part 11 being a standard shackle bolt and the outer part forming the inner bearing member, such inner bearing member being formed of a length of steel tubing having corrugations or beads 12 and having serrations 13 at each end thereof. Clamping of the two side members of the shackle against the serrated portion will maintain the inner bearing member stationary relative to the shackle, but if desired, the end members of the shackle may be serrated to complementally fit the serrations 13. The spaced corrugations or beads, as shown in Figs. 1 and 3, do not offer the same resistance as the threads 10, as shown in Fig. 2, but the additional surface area added by the corrugations or beads sets up additional resistance when the inner bearing member is moved relative to the bushing 6.

The bushing 6 is maintained under compression by the turned in ends 7 of the outer bearing 5 and inasmuch as the bushing is highly compressed it obviously has a great amount of expansibility, with the result that the inherent nature of the material offers a permanent lubricated surface for the inner bearing and the expansive force of the highly compressed bushing offers appreciable resistance against movement to give a shock absorber effect. It is obvious that the degree of compression of the material 6 may be varied considerably so that while this material may be still compressed and permanently retained within the outer bearing its effect upon the bearing member might be merely one of lubrication.

The modification illustrated in Fig. 4 brings into play substantially the same elements as disclosed in Fig. 2, the threads 10 which form a part of the stud 14 being mounted in the frame of the automobile chassis and the outer bearing 5 having a press fit relation with the brake cross shaft tube 15. The amount of compression applied to the bushing 6 need not be so great in this particular assembly. One of the main features in this particular adaptation is that while the bearing supports the cross shaft and eliminates all end thrust, it does permit of considerable flexibility as to alignment between the cross brake shaft and the stud 14.

In Fig. 5 the cross brake shaft 16 is shown as being of the solid type and extending through the frame 17 of the chassis to receive a brake rod lever 18. One end of the outer bearing member is turned in as at 7 but the other end 19 is bolted direct to the chassis frame. This mounting insures the bushing material to be held permanently within the outer bearing and at the same time allows considerable flexibility as to the axial alignment between the shaft and the bearing.

The tie rod end as illustrated in Fig. 6 is quite similar in general arrangement to the disclosure in application of Newton Skillman Serial No. 376,057 with the exception that stud 20 is provided with a threaded portion 21 instead of the conventional ball joint. The bushing material 6 is placed under relatively great compression because of the thickness allowed such material in view of the use of a spherical outer bearing member or housing 22. In originally forming a tie rod end of this type the upper end of the outer housing, as shown in Fig. 6, is usually formed in the shape shown, but the lower end 23 is preferably cylindrical in shape and then closed in and deformed to the shape shown to further compress and permanently lock the bushing material in place. The relation between the threads 21 and the bushing 6 prevents end thrust and prevents the bushing from being packed out of place but at the same time there is sufficient resiliency between the stud 20 and the extension 24 of the tie rod to allow for considerable side play in addition to the right angular oscillation between the two parts. Inserts 25 and 26 may be used to keep the bushing material in place and under compression.

It will thus be seen that the annular corrugations, the turned in ends of the outer bearing member and the amount of expansibility exerted by the bushing all cooperate one with the other. By having threads or corrugations extending the length of the inner bearing member it will be seen that the effective surface area of the inner bearing member is greatly increased and in practically all cases is equal to or greater than the effective surface area of the outer bearing member. Thus, by placing the bushing material under a high compression it will be seen that such bushing material will enter into each of the grooves formed by the corrugations and effectively lock the members against relative end thrust. With such resistance against end thrust it is possible to turn in the ends of the outer bearing member to lock the bushing material in place and maintain the same under compression but still leave enough space between the inner and outer bearing members as to allow for an appreciable amount of self-alignment between the two bearing members; in other words, it will be seen that the alignment between the inner and outer bearing members may be disturbed considerably without affecting the operation of the bearing as a whole.

What we claim is:

1. A bearing of the oscillatable type comprising an inner bearing member having a threaded portion thereon, an outer bearing member, a bushing of compressible expansible material substantially surrounding said inner member and compressed between the surfaces of said two bearing members and in between the threads of the inner bearing member, said outer and inner bearing members having respective portions so formed and cooperating as to permanently maintain said material under compression and permanently lock the bearing members against relative movement in the direction of the axis of said threads.

2. A bearing of the oscillatable type comprising an inner bearing member having a threaded portion thereon, an outer bearing member, a bushing of compressible expansible material substantially surrounding said inner member and compressed between the surfaces of said two bearing members and in between the threads of the inner bearing member, said outer bearing member having a portion thereof so formed as to permanently maintain said material under compression and permanently lock the inner bearing member in position, and means for preventing relative axial movement between said members whereby relative rotative movement between said threaded member and said bushing material causes further compression of said bushing material.

3. A bearing of the oscillatable type comprising an inner bearing member having a threaded portion thereon, an outer bearing member, a bushing of compressible expansible material substantially surrounding said inner member and compressed between the surfaces of said two bearing members and in between the threads of the inner bearing member, said outer bearing member having a portion thereof so formed as to permanently maintain said material under compression and permanently lock the inner bearing member in position, and means for preventing relative axial movement between said members whereby said threads cause axial compression of said bushing material.

4. A bearing of the oscillatable type comprising an inner bearing member having a threaded portion thereon, an outer bearing member, a bushing of compressible expansible material substantially surrounding said inner member and compressed between the surfaces of said two bearing members and in between the threads of the inner bearing member, said outer bearing member having a portion thereof so formed as to permanently maintain said material under compression and permanently lock the inner bearing member in position, and means for preventing relative axial movement between said members whereby said threads cause axial compression of said bushing material in one direction or the other along the axis of the bearing depending upon the direction of oscillation.

5. A combined self-lubricating and snubbing shackle bearing comprising an inner tubular bearing member having a portion of its surface of longitudinally varying contour, an outer bearing member having a portion at each end thereof of longitudinally varying contour, a layer of lubricant impregnated material compressed between the surfaces of said two bearing members and contacting with said portions of longitudinally varying contour whereby to prevent relative longitudinal movement between the bearing members, said material acting expansively against the surfaces of said two members and being relatively movable with respect to the inner bearing member only, a plurality of projections and indentations formed in the surface of said inner bearing member of a far greater number than required to prevent relative longitudinal movement between the two bearing parts for increasing the surface contact between said inner bearing member and said bushing whereby the expansive force between the bushing and the relatively movable inner bearing member will greatly increase the friction between said inner bearing member and said lubricant impregnated bushing, the ends of said inner bearing member being serrated for contact with the side members of the shackle, and a shackle bolt for clamping the side members against the serrated portion of said inner bearing member.

6. A combined self-lubricating and snubbing shackle bearing comprising an inner tubular bearing member having a portion of its surface of longitudinally varying contour, an outer bearing member having a portion at each end thereof of longitudinally varying contour, a layer of lubricant impregnated material compressed between the surfaces of said two bearing members and contacting with said portions of longitudinally varying contour whereby to prevent relative longitudinal movement between the bearing members, said material acting expansively against the surfaces of said two members and being relatively movable with respect to the inner bearing member only, a plurality of projections and indentations formed in the surface of said inner bearing member of a far greater number than required to prevent relative longitudinal movement between the two bearing parts for increasing the surface contact between said inner bearing member and said bushing whereby the expansive force between the bushing and the relatively movable inner bearing member will greatly increase the friction between said inner bearing member and said lubricant impregnated bushing, and a shackle bolt extending through said tubular inner member, one end of said bearing member and the side member of the shackle being formed to have an interfitting relationship to prevent relative rotation between said inner bearing and said side member.

7. A two part self-lubricating bearing of the oscillatable type, comprising a substantially cylindrical inner member having a portion of its surface of longitudinally varying contour, a sheet metal outer bearing member having portions of its surface of longitudinally varying contour, a bushing of compressible expansible material substantially surrounding said inner member and compressed between the surfaces of said two bearing members and contacting with said portions of longitudinally varying contour, said compression of said material being such as to preserve the expansibility and integral structure of said material and said portions of longitudinally varying contour being of sufficient surface area as to prevent longitudinal movement between the two bearing parts, one of said bearing parts being movable relative to said compressed bushing and the other bearing part being non-movable relative thereto, said movable bearing part having its surface provided with projections and indentations of a far greater number than required to prevent relative longitudinal movement between the two bearing parts whereby to provide an increased surface area contact between said movable bearing and said bushing to greatly increase the friction therebetween to set up a positive drag between the parts while still maintaining the self-lubricating quality between said bushing and movable bearing element.

8. A combined self-lubricating bearing and snubbing unit of the oscillatable type formed solely of two parts, comprising an inner relatively rotatable drag member and an outer bearing member, an annular layer of lubricant impregnated compressible expansible material compressed between the surfaces of said two bearing members, the outer bearing member being stationary relative to the compressed material and having portions of the surface thereof formed inwardly tending to prevent longitudinal movement between said two parts, circumferential projections formed on said inner member and cooperating with the inturned portions of the outer member for preventing longitudinal relative movement between the two parts, said compressed material acting expansibly against said inturned portions and projections to assist in preventing relative longitudinal movement, and a series of spaced circumferential projections and indentations formed integrally on and extending substantially the length of said inner bearing member for materially increasing the effective area against which the compressed lubricant impregnated material contacts for materially increasing the friction between said inner bearing member and said lubricant impregnated material over and above that provided by the compression of the material and the projections for preventing relative longitudinal movement, said material being highly compressed to a degree beyond that required for permanent lubrication of the bearing whereby said high compression and friction formed by said spaced circumferential projections and indentations set up a positive snubbing action upon relative movement of the bearing parts.

9. A bearing of the oscillatable type comprising an inner bearing member having a substantially cylindrical surface with circumferential projections and indentations spaced along substantially the entire surface thereof, an outer bearing member circumferentially spaced from said projections, and a bushing of lubricant impregnated compressible expansible material substantially surrounding said inner member and compressed between the surfaces of said two bearing members and in between said projecting portions, the compressive force upon said material by said inner and outer bearing members being such that said material will still retain its inherent texture and expansibility whereby it acts expansibly against the surfaces of the inner and outer members and lubricates the surface of the relatively rotatable inner member, said outer bearing member having a portion of its surface permanently distorted to cooperate with said projections and indentations so as to combine with said compressed expansible material to permanently lock the inner bearing member in position, the circumferential projections and indentations being of a far greater number than required to lock said bearing member in position, the surface area of said additional circumferential projections and indentations over and above those required for locking purposes being such as to cause an appreciable amount of drag between the material and the inner bearing member, said material being highly compressed to a degree beyond that required for permanent lubrication of the bearing whereby said high compression and friction formed by said spaced circumferential projections and indentations set up a positive snubbing action upon relative movement of the bearing parts.

10. In a self-lubricating bearing of the type having an inner bearing of longitudinally varying contour locked in position by compressed relatively rotatable bushing material having an enclosing backing of a relatively non-rotatable bearing shell, a plurality of spaced circumferential projections and indentations on said inner bearing member for producing a combined snubbing action and permanent lubricating action, said projections and indentations increasing the friction between the inner bearing and bushing by increasing the effective surface between the inner bearing and bushing over and above that provided by the longitudinally varying contour for locking the inner bearing in position, the compression between the bushing and inner bearing member being a considerable amount over that required for permanent lubrication.

11. A combined self-lubricating bearing and snubbing unit of the oscillatable type, comprising an inner relatively rotatable bearing member, an outer bearing member, a portion of the inner member being of longitudinally varying contour, an annular layer of lubricant impregnated compressible expansible material compressed between the surface of said two bearing members and around said inner bearing member to lock the inner bearing member in position, said material being adapted to expand on wearing to maintain lubrication of the inner bearing member, said outer bearing member having a portion of its surface shaped to maintain said material under compression and lock the inner bearing member in position, said portion of varying contour, expansible material, and outer bearing member cooperating to prevent relative longitudinal movement between said bearing members, and a plurality of spaced circumferential projections and indentations on said inner bearing member over and alove those required for locking the inner bearing in position for appreciably increasing the friction between said inner bearing member and said compressed bushing, said bushing being compressed to an extent beyond that sufficient to provide permanent lubrication whereby said increased compression of the bushing and said friction surfaces on the inner bearing produce a positive snubbing action.

NEWTON SKILLMAN.
ROBERT THUNER.